UNITED STATES PATENT OFFICE.

ALEXANDER D. ELBERS, OF HOBOKEN, NEW JERSEY.

PROCESS OF TREATING FINE IRON ORES FOR BLAST-FURNACES.

SPECIFICATION forming part of Letters Patent No. 708,331, dated September 2, 1902.

Application filed May 9, 1902. Serial No. 106,653. (No specimens.)

*To all whom it may concern:*

Be it known that I, ALEXANDER D. ELBERS, a citizen of the United States, residing in the city of Hoboken, county of Hudson, and State of New Jersey, have invented a new and useful Process of Treating Fine Iron Ores for Blast-Furnaces, of which the following is a full, clear, and exact description.

The object of this invention is to compact fine iron ores before charging them into the blast-furnace.

The invention consists in intimately mixing fine iron ores with moderate quantities of pulverized blast-furnace slag of suitable composition and in burning the mixes to clinker in rotary kilns or drums.

It is well known that iron ores which are finely divided in their natural state or become fine in the blast-furnace by decrepitating and crumbling cause great inconvenience in smelting, partly because a considerable portion of them is blown out of the furnace-mouth when the air-blast is at high pressure and also because they render the burden too dense for the proper escape of gases. In order to render such fine ores more serviceable, I propose to mix them intimately with moderate quantities of pulverized blast-furnace slag of suitable composition and to burn the mixes to clinker in rotary kilns of the cement-burning type, which are kept heated by blowing in at their discharge end either liquid or pulverized solid fuel. Instead of such kilns revolving drums may also be employed that are connected with a stationary heating-furnace, and a portion of the fuel may also be mixed with the charges. These are, however, well-known details and questions of comparative economy under varying local conditions, the main consideration being that the rotary motion of the kilns or drums prevents the sintering charges from becoming consolidated into large masses that are difficult to remove and break up and that its speed can be regulated in such manner as to cause them to form clinker of suitable size. Fine ores of the kind herein considered are rich in iron and correspondingly low in earthy constituents, and they cannot be reduced to clinker by the most intense heat that it is practicable to apply unless they are admixed with a flux that will melt quite "thin fluid" at about incipient white heat. I have found by my experiments that blast-furnace slag of the singulo-silicate type, or of an oxygen ratio of about one to one, low in alumina and made with dolomitic or magnesian limestone, is the most suitable flux, so far as its combining energy goes, as much less of it is required than of the more acid as well as of the more aluminous kinds; but slag of that silicate constitution usually contains more of sulfur than it can lose by oxidation while it is being burned in admixture with the ore, and if it remelts before the sulfur is nearly out of it then the resulting clinker will not be sufficiently tough to withstand the pressure to which it becomes subjected in the blast-furnace. Such slag should therefore be either superficially or entirely desulfurized before it is mixed with the ore. Whether the one or the other treatment is to be adopted depends on the oxidizing effect of the kiln-burning. Thus in some cases pulverized crude slag containing as much as one per cent. of sulfur may lose nearly all of it in the kiln, and in others one-half of one per cent. may prove detrimental. The slag from blast-furnaces charged with charcoal for fuel would be the most desirable, because it seldom contains as much as one-quarter of one per cent. of sulfur, provided it is made sufficiently basic and that it becomes sufficiently homogeneous to answer the purpose of a flux for the application herein considered. I claim, however, the use of any kind of pulverized slag, whether crude or especially treated and whether smelted in blast-furnaces, in cupola-furnaces, or in the open-hearth, because the novelty of my invention consists chiefly in the recognition of the fact that such compositions melt at a somewhat lower temperature than that which is required for burning cement-clinker from mixes of clay and lime in rotary kilns and that they unite with portions of the gangue of fine iron ores to cementitious compounds of sufficient toughness to produce clinker of satisfactory consistency.

I now proceed to describe the novel steps of my process, as will be hereinafter claimed.

In order to prepare fine ore for the kiln-burning, I first separate the fine particles from the coarser ones by sifting, crush the latter, so that their mass will pass through from ten to twenty meshes to the linear inch, and then remix the whole in a revolving drum or other suitable contrivance with a suitable proportion of the slag that is to be used for flux. In some cases, as with the finest of Lake Superior ores, the bulk, or from forty to sixty per cent., usually consists of sand-like particles that readily pass through forty meshes, and the remainder, in about equal parts, of coarser particles that pass through about ten meshes, and of small lumps up to one or two ounces in weight. The coarse part of the ore usually contains more of gangue or earthy constituents than the sand-like, and in being crushed to ten or twenty mesh size yields an appreciable amount of very fine and almost impalpable stuff. This fine stuff becomes most intimately intermixed with the flux and forms with it during the burning a softening and cementitious paste by which the coarser particles of the mass become agglomerated.

The ores above referred to usually contain from two to three per cent. of silica. To flux that amount properly would require about the treble quantity of singulo-silicate slag; but as the gangue inclosed in the coarser particles of the ore does not come in contact with the flux a smaller amount will usually suffice. Thus I have found that an ore averaging 2.7 per cent. of silica and 1.4 per cent. of alumina can be satisfactorily compacted with three per cent. of slag by heating the mix in crucibles to a temperature that is not quite high enough to reduce a Portland-cement mix to clinker. It is, however, to be assumed that in actual practice the requirement will be from twenty-five to fifty per cent. greater, because it is not likely that the mass will become so thoroughly mixed. If, on the other hand, all of the ore is in a finely-divided state, as is the case with some hematites, it may require more flux than it is economical to use, and in that case an admixture of about ten per cent. of fine magnetite or of pulverized siderite with a moderate quantity of slag-flux will be more suitable, the hematite being the most refractory ore, as far as the mere application of the heat goes, the magnetite less so, and the siderite the most fusible.

As to desulfurizing blast-furnace slag of suitable fluxing properties in the molten as well as in the solid state, there are several United States patents on record, granted to me. (April 14, 1896, No. 558,370; March 30, 1897, No. 579,820; May 23, 1899, No. 625,656.) For the purpose herein considered it may, however, suffice in some cases to heat the pulverized slag in revolving drums under admission of air by an extraneous fire to a full-red heat, so as to desulfurize it superficially, whereas the slag from charcoal blast-furnaces need not be treated at all for sulfur.

For burning the ore to clinker I prefer an apparatus similar in construction to, but about one-third shorter than, the modern rotary cement-kiln, which consists of a slightly-inclined steel cylinder lined with fire-brick and revolving on rollers at the rate of one revolution in from one to three minutes. The ore-mix is to be fed in continuously at the upper end. When it reaches the lower third of the kiln, where the temperature is nearly up to incipient white heat, the flux begins to melt and then agglomerates the ore into small lumps, which clog together and finally issue as compact clinker at the lower end. The size of the clinker can be regulated to some extent by decreasing or increasing the speed of the revolutions and will probably average about walnut size.

I further declare that in my invention I do not confine myself to slag derived as a by-product, but may use also artificial silicate compositions of a similar nature expressly smelted for the purpose.

Having thus described my invention, I claim as new and desire to secure by Letters Patent—

1. The method of compacting fine iron ores, which consists in intimately mixing fine iron ores with moderate quantities of pulverized slag of suitable composition, and in burning such mixes to clinker under rotating action, substantially as described.

2. The method of compacting fine iron ores, which consists in mixing said fine ores with pulverized slag, burning such mixes to a clinker and maintaining the mass in constant agitation during the burning to effect the segregation of the plastic clinker into lumps, substantially as and for the purpose described.

3. The method of compacting fine iron ores, which consists in mixing said fine ores with pulverized slag of the singulo-silicate type or of an oxygen ratio of one to one, low in alumina, burning such mixes to a clinker, and maintaining the mass in constant agitation during the burning to effect the segregation of the plastic clinker into lumps substantially as and for the purpose described.

In testimony whereof I have signed my name to this specification in the presence of two subscribing witnesses.

ALEXANDER D. ELBERS.

Witnesses:
J. FRED. ACKER,
JNO. M. RITTER.